Oct. 24, 1950  E. C. ALIX ET AL  2,527,385
PICKER STICK CONNECTION

Filed Sept. 6, 1947  2 Sheets-Sheet 1

INVENTOR.
ELMER C. ALIX
HARRY A. WILSON
BY
Louis L. Gagnon
ATTORNEY

Patented Oct. 24, 1950

2,527,385

UNITED STATES PATENT OFFICE 2,527,385

PICKER STICK CONNECTION

Elmer C. Alix, Charlton City, and Harry A. Wilson, South Spencer, Mass.

Application September 6, 1947, Serial No. 772,577

6 Claims. (Cl. 139—156)

This invention relates to improvements in loom construction and has particular reference to novel pivotal mounting means and motion imparting means for the picker sticks of looms and method of making the same.

One of the principal objects of the invention is to provide automatically releasable means for pivotally supporting the picker stick and to further provide automatically releasable means for connecting the sweep stick with the picker stick and method of making the same whereby abnormal strains directed to said means will prevent possible breakage of the picker stick and associated parts of the loom.

Another object is to provide pivot means for the picker stick which may be set so as to automatically release its pivotal function when a load of an excess amount is directed to said pivot means.

Another object is to provide a sweep stick connection with the picker stick which will automatically release when a load of an excessive amount is directed thereto and which may be adjusted according to the load it is to resist.

Other objects and advantages of the invention will become apparent from the following description taken in connection with the accompanying drawings and it will be apparent that many changes may be made in the details of construction, arrangement of parts and method shown and described without departing from the spirit of the invention as expressed in the accompanying claims. We, therefore, do not wish to be limited to the exact details of construction, arrangement of parts and method shown and described as the preferred forms only have been given by way of illustration.

Referring to the drawings.

It has been found, in the past, that due to improper function of the shuttle box operating mechanism that the picker, which directs the shuttle transversely of the lay of the loom, instead of properly aligning with a conventional guide slot in the shuttle box might accidentally engage with the upper or lower edge of the slotted portion thereby preventing the proper response of the picker to the pull of the sweep stick. In such instances the picker stick is caused to bend under the strain of the pull of the sweep stick with the result that the picker stick either breaks or the conventional lug strap which connects the sweep stick with the picker stick will break or the supporting castings may break. A further danger is that the said picker may snap free and when engaging the shuttle will cause the same to be deflected upon its proper path of movement at a greatly accelerated speed with the result that the shuttle might cause a smash in the cloth, cause injury to the parts of the loom or might cause injury to the operator.

The present invention, therefore, is directed to overcoming the above difficulties through the provision of automatic releasing means for pivotally supporting the picker stick either separately of or in combination with automatic releasing means for connecting the sweep stick with the picker stick. Such releasable means, in further accordance with the invention, may be adjusted to accommodate for a given stress or load whereupon any excess of this given stress or load will cause said automatic releasing means to function and thereby prevent breakage of the picker stick or deflection of the shuttle.

Figure 1:
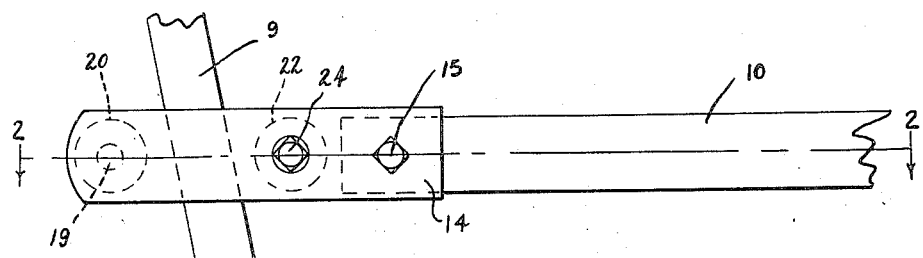
Fig. 1 is a side elevational view of a sweep stick connection with the picker stick embodying one form of the invention.
Figure 2:
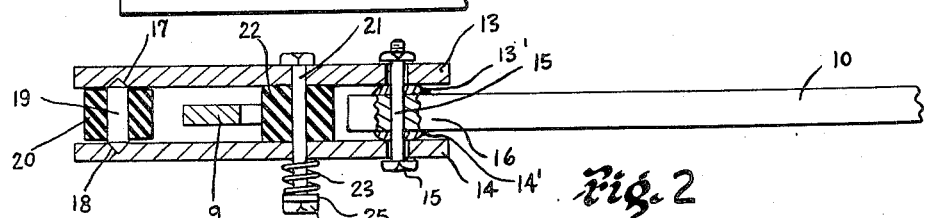
Fig. 2 is a sectional view taken as on line 2—2 of Fig. 1.

Referring more particularly to the drawings wherein like characters of reference designate like parts throughout the several views, for ease of description and understanding of the present invention, applicant has confined the drawings to the immediate parts embodying the invention. It is to be understood that the picker stick 9 is of the conventional type used with looms and that the sweep stick 10 is of the conventional type. In accordance with conventional practice, the picker stick 9 is pivotally connected, as illustrated at 11, to the rocker iron or picker stick stand 12. For ease of description of one particular embodiment of applicant's invention, the releasable means of Figs. 1 and 2 is confined to the sweep stick connection with the picker stick. In this particular instance, the sweep stick connected embodies a pair of strap portions or straps 13 and 14 pivotally connected, adjacent one end thereof, by a bolt or the like 15 to the adjacent end 16 of the sweep stick 10. Suitable spacer members 13' and 14' are positioned between said straps and said sweep stick. The opposed ends of the straps 13 and 14 are provided with cone-shaped pockets 17 and 18 adapted to receive the tapered ends of a spacer member 19. The spacer member 19 is provided with a sleeve of resilient material 20 of leather, rubber, canvas or other suitable means. The said sleeve 20 merely functions as protective means for the spacer member 19 and cushions the shock of the pull of the sweep stick 10 on the picker stick 9.

To releasably retain the cone-shaped ends of the spacer means 19 in the cone-shaped pockets 17 and 18 while the sweep stick pulls the picker stick, according to its conventional operation, there is provided a tie bolt 21 extending through the straps 13 and 14 intermediate the spacer member 19 and the pivot bolt 15. On the tie bolt 21, there is provided a sleeve 22 similar to the sleeve 20. The tie bolt 21 has a free end extending outwardly of one of the strap members 13 or 14, as desired, on which is mounted a coil spring or the like 23. A suitable nut 24 working against a washer 25 which in turn engages the adjacent end of the coil spring 23 may be tightened or loosened according to the amount of holding action desired of the pin member 19 in the cone-shaped pockets 17 and 18. By tightening or loosening the nut 24, the extent of holding action of the straps with the pin 19 may be regulated. It is pointed out that the sleeve 22 not only functions as cushioning means but also resiliently retains the straps in spaced relation against the tightened action of the tie bolt 21.

It will be seen that should the picker carried by the picker stick 9 be accidentally moved into engagement with the end wall of the slotted portion of the shuttle box, as described above, whereby the picker is not free to function in its normal manner in directing the shuttle transversely of the lay of the loom, the pull of the sweep stick on the picker stick 9 will be relieved by forcing the pin member 19 outwardly of the cone-shaped pockets 17 and 18. It is particularly pointed out that the coil spring 23 functions to permit this to take place. In the absence of any abnormal action of the picker taken place, the pin 19 will normally retain its holding action with the cone-shaped pockets and will function to swing the picker stick about its pivot 11 and thereby direct the shuttle transversely of the lay of the loom.

Figure 3:
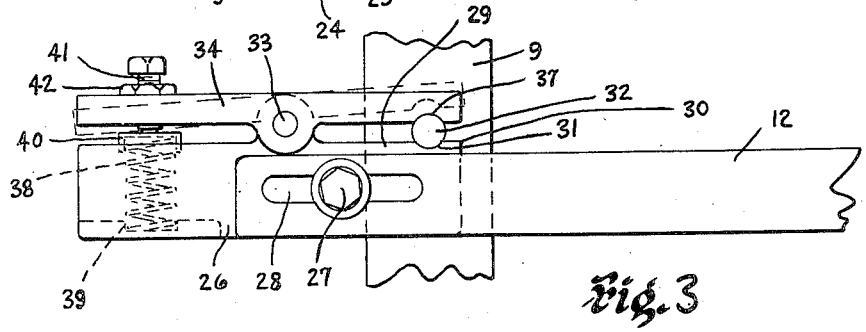
Fig. 3 is a side elevational view of a picker stick pivotal connection with the rocker iron of the loom or conventional picker stick stand and showing a further embodiment of the invention.
Figure 4:
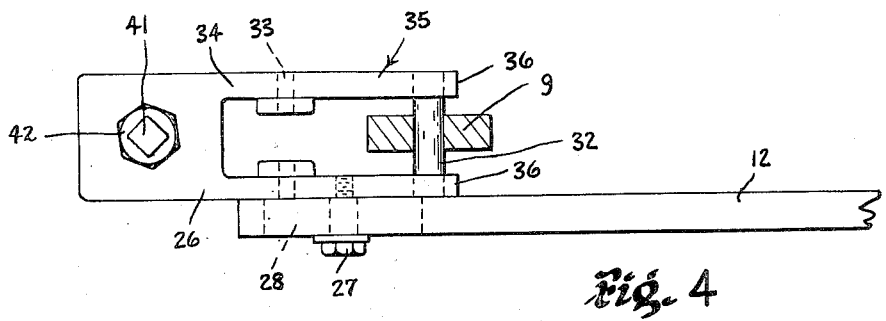
Fig. 4 is a plan view of the device illustrated in Fig. 3 showing the picker stick in section.
Figure 5:
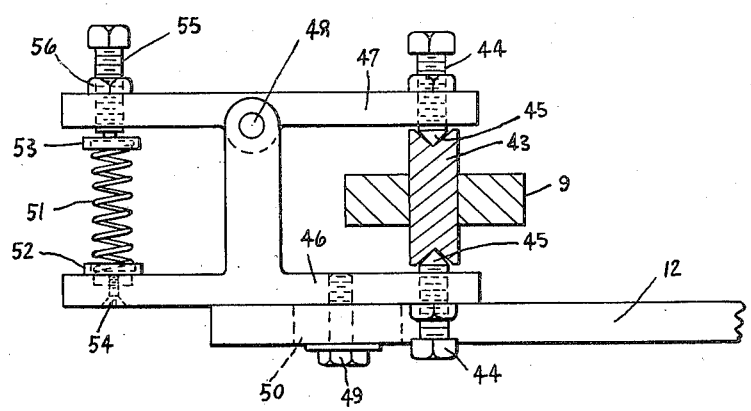
Fig. 5 is a view generally similar to Fig. 4 of a further modified form of picker stick pivot.

Referring to Figs. 3 and 4, instead of utilizing the conventional pivot support 11 for the picker stick 9, there is shown a releasable pivotal support for said picker stick. In this instance, the rocker iron 12 has a base support 26 secured thereto by a bolt or the like 27 which extends through the longitudinal slot 28 adjacent the end thereof. The support 26 has a bifurcated portion 29 which comprises two spaced branches 30 each having a cylindrical shaped recess 31 therein. The cylindrical shaped recesses are adapted to receive a pivot pin 32 which extends through the picker stick 9. Pivotally connected to the base support 26, as illustrated at 33, there is a top support member 34 having a bifurcated portion 35 having each of its branches 36 provided with a cylindrical shaped recess 37 also adapted to receive the pivot pin 32. The said pivot pin 32 is clampingly held within the cylindrical shaped recesses 31 and 37 by means of a coil spring 38. The coil spring 38, adjacent one end thereof, fits within a recess 39 formed in the base support 26 and adjacent its opposed end fits within a cup-shaped member 40 carried by an adjustable bolt or the like 41. The compression tension of the spring 38 may be varied by tightening or loosening the bolt 41. A suitable lock nut 42 is provided for retaining the bolt in adjusted position. By proper adjustment of the bolt 41, the grip of the cylindrical shaped recesses 31 and 37 with the pivot pin 32 may be varied according to the holding action desired thereof. If the strain on the pivot pin 32 is of an abnormal nature, as for example from one of the causes previously described above in connection with the construction shown in Figs. 1 and 2, the said pin will become dislodged from the cylindrical recesses 31 and 37. Under the normal load and in the absence of undue strain thereon, the said cylindrical recesses will function as a pivot bearing in which the pin 32 will pivotally support the picker stick 9 but will constantly be free to automatically release said pin if the load or strain thereon becomes abnormal. In Fig. 5, there is illustrated a further modification wherein the pivot pin 43 is provided with cone-shaped recesses in the ends thereof and is adapted to receive adjustable bolt members or the like 44 each having a tapered end 45 fitting within the respective cone-shaped recesses. The bolts 44 are carried by supports 46 and 47 which are pivotally connected intermediate the ends thereof by a pivot 48. The support 46 is attached to the rocker iron 12 by a bolt or the like 49 extending through the longitudinal slot 50 in the end thereof. A coil spring 51 having its opposed ends seated in suitable cup members 52 and 53 is adapted to regulate the holding action of the cone-shaped ends 45 in the cone-shaped recesses in the pivot pin 43. The cup member 52 is secured to the support 46 by a screw or the like 54 and a cup-shaped member 53 is carried by an adjustable bolt 55 by means of which the compression tension on the spring 51 may be varied according to the holding action desired. The device otherwise functions in a manner similar to the device shown in Figs. 3 and 4. A suitable lock nut 56 is provided for holding the bolt 55 in adjusted position.

It is to be understood that instead of forming the bolts 44 with a cone-shaped point 45, the said ends 45 may each be provided with a cone-shaped recess, in which instance, the pivot pin 43 would be provided with tapered points to fit within the recesses of the bolts 44.

Figure 6:
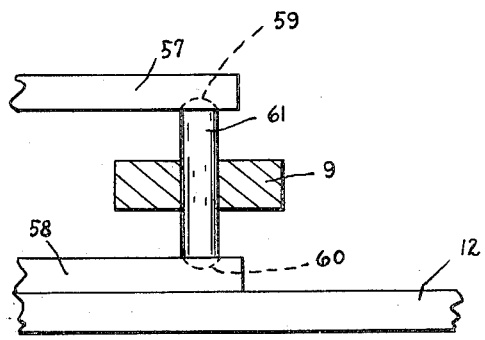
Fig. 6 illustrates a further modification of picker stick pivot in accordance with the invention.

Instead of providing adjustable bolts 44, as shown in Fig. 6, the supports 57 and 58 simulating the supports 46 and 47, may be provided with hemi-spherical recesses 59 and 60 for directly receiving the opposed hemi-spherically shaped ends of a pivot pin 61, simulating the pivot pin 43. It is to be understood that the supports 57 and 58, like the supports 46 and 47, are pivotally connected with each other and are provided with an adjustable spring type arrangement similar to the device illustrated in Fig. 5 for regulating the holding action of the supports 57 and 58 with the pivot pin 61. The device otherwise functions in a manner similar to the devices illustrated in Figs. 3, 4 and 5.

It is to be understood that although applicant has shown and described either the pivot pin release or the sweep stick release separately of each other, that a sweep stick arrangement similar to that shown in Figs. 1 and 2 might be incorporated with any of the picker stick pivot releases shown and described herein.

It has been found that the holding pressure of the springs of the various devices described above must be approximately 50 lbs. This pressure, however, may be increased or decreased according to the position of adjustment of the bolts 24, 41 or 55 as the case may be.

Although the devices embodying the invention are shown applied to the sweep stick connection with the picker stick and with the picker stick pivot other applications thereof may be made, as for example, with the sweep arm of the loom.

From the foregoing description, it will be seen that simple, efficient and economical means and methods have been provided for accomplishing all of the objects and advantages of the invention.

Having described our invention, we claim:

1. A device of the character described comprising a support member, a picker stick, connection means connecting said support with said picker stick, a sweep stick member and connection means for connecting said sweep stick member with said picker stick, one of said connection means comprising a pair of supports pivotally connected with each other intermediate the ends thereof and having engagement portions adjacent one of the ends thereof and resilient means intermediate the opposed ends thereof for yieldingly urging the ends having the engagement portions thereon toward each other about the intermediate pivotal connection, one of said supports being adjustably secured to one of said members, said engagement portions being adapted to releasably engage the opposed ends of a pin, said pin having a body portion extending through the picker stick to provide a connection therewith and means for varying the tension of said resilient means.

2. A device of the character described comprising a support member, a picker stick, connection means connecting said support with said picker stick, a sweep stick member and connection means for connecting said sweep stick member with said picker stick, one of said connection means comprising a pair of supports pivotally connected with each other intermediate the ends thereof and having engagement portions adjacent one of the ends thereof and recessed portions on the inner sides of the opposed ends thereof, with one of said recessed portions being adjustable toward the other, resilient means having end portions lying within the respective recessed portions for yieldingly urging the ends having the engagement portions thereon toward each other about the intermediate pivotal connection, one of said supports being adjustably connected to one of said members, a pin member extending through the picker stick, said engagement portions being adapted to releasably engage the opposed ends of said pin and means for varying the tension of said resilient means by adjusting said adjustable recessed portion toward the other whereby the releasable grip of the engagement portions with the opposed ends of the pin may be varied.

3. A device of the character described comprising a support member, a picker stick, connection means connecting said support with said picker stick, a sweep stick member and connection means for connecting said sweep stick member with said picker stick, one of said connection means comprising a pair of supports pivotally connected with each other intermediate the ends thereof and having engagement portions adjacent one of the ends thereof and resilient means intermediate the opposed ends thereof for yieldingly urging the ends having the engagement portions thereon toward each other about the intermediate pivotal connection, one of said supports being adjustably secured to one of said members, said engagement portions being adapted to releasably engage the opposed ends of a pin, said pin having a body portion extending through the picker stick to provide a connection therewith, means for varying the tension of said resilient means, and the other of said connection means comprising a pair of strap portions pivotally connected adjacent one end thereof to the opposed sides of one end of the sweep stick with the intermediate portions thereof straddling the picker stick and having engagement means adjacent the opposed ends thereof, pin means releasably engaging the engagement means and tie means intermediate the pivot means and the picker stick having an adjustable resilient member thereon for yieldingly urging said strap portions toward each other for controlling the grip of the engagement portions with the pin means.

4. A device of the character described comprising a support member, a picker stick, connection means connecting said support with said picker stick, a sweep stick member and connection means for connecting said sweep stick member with said picker stick, one of said connection means comprising a pair of supports pivotally connected with each other intermediate the ends thereof and having engagement portions adjacent one of the ends thereof and recessed portions on the inner sides of the opposed ends thereof, with one of said recessed portions being adjustable toward the other, resilient means having end portions lying within the respective recessed portions for yieldingly urging the ends having the engagement portions thereon toward each other about the intermediate pivotal connection, one of said supports being adjustably connected to one of said members, a pin member extending through the picker stick, said engagement portions being adapted to releasably engage the opposed ends of said pin, means for varying the tension of said resilient means by adjusting said adjustable recessed portion toward the other whereby the releasable grip of the engagement portions with the opposed ends of the pin may be varied, and the other of said connection means comprising a pair of strap portions pivotally connected adjacent one end thereof to the opposed sides of one end of the sweep stick with the intermediate portions thereof straddling the picker stick and having engagement means adjacent the opposed ends thereof, pin means releasably engaging the engagement means and tie means intermediate the pivot means and the picker stick having an adjustable resilient member thereon for yieldingly urging said strap portions toward each other for controlling the grip of the engagement portions with the pin means.

5. A device of the character described comprising a support member, a picker stick, connection means connecting said support with said picker stick, a sweep stick member and connection means for connecting said sweep stick member with said picker stick, one of said connection means comprising a pair of supports pivotally connected with each other intermediate the ends thereof and having engagement portions adjacent one of the ends thereof and resilient means intermediate the opposed ends thereof for yieldingly urging the ends having the engagement portions thereon toward each other about the intermediate pivotal connection, one of said supports being adjustably secured to one of said members, said engagement portions being adapted to releasably engage the opposed ends of a pin, said pin having a body portion extending through the picker stick to provide a connection therewith, means for varying the tension of said resilient means, and the other of said connection means comprising a pair of strap portions pivotally connected adjacent one end thereof to the opposed sides of one end of the sweep stick with the intermediate portions thereof straddling the picker stick and having engagement means adjacent the opposed ends thereof, pin means releasably engaging the engagement means, said pin means having cushioning means thereon, tie means intermediate the pivot means and the picker stick having an adjustable resilient member thereon for yieldingly urging said strap portions toward each other for controlling the grip of the engagement portions with the pin means, and cushioning means on said tie means intermediate said strap portions.

6. A device of the character described comprising a support member, a picker stick, connection means connecting said support with said picker stick, a sweep stick member and connection means for connecting said sweep stick member with said picker stick, one of said connection means comprising a pair of supports pivotally connected with each other intermediate the ends thereof and having engagement portions adjacent one of the ends thereof and recessed portions on the inner sides of the opposed ends thereof, with one of said recessed portions being adjustable toward the other, resilient means having end portions lying within the respective recessed portions for yieldingly urging the ends having the engagement portions thereon toward each other about the intermediate pivotal connection, one of said supports being adjustably connected to one of said members, a pin member extending through the picker stick, said engagement portions being adapted to releasably engage the opposed ends of said pin, means for varying the tension of said resilient means by adjusting said adjustable recessed portion toward the other whereby the releasable grip of the engagement portions with the opposed ends of the pin may be varied, and the other of said connection means comprising a pair of strap portions pivotally connected adjacent one end thereof to the opposed sides of one end of the sweep stick with the intermediate portions thereof straddling the picker stick and having engagement means adjacent the opposed ends thereof, pin means releasably engaging the engagement means, said pin means having cushioning means thereon, tie means intermediate the pivot means and the picker stick having an adjustable resilient member thereon for yieldingly urging said strap portions toward each other for controlling the grip of the engagement portions with the pin means, and cushioning means on said tie means intermediate said strap portions.

ELMER C. ALIX.
HARRY A. WILSON.

REFERENCES CITED

The following references are of record in the file of this patent:

UNITED STATES PATENTS

| Number | Name | Date |
|---|---|---|
| 524,571 | Bartelt | Aug. 14, 1894 |
| 1,488,532 | Douglass | Apr. 1, 1924 |

FOREIGN PATENTS

| Number | Country | Date |
|---|---|---|
| 23,133 | Germany | Aug. 5, 1882 |